Patented Nov. 17, 1925.

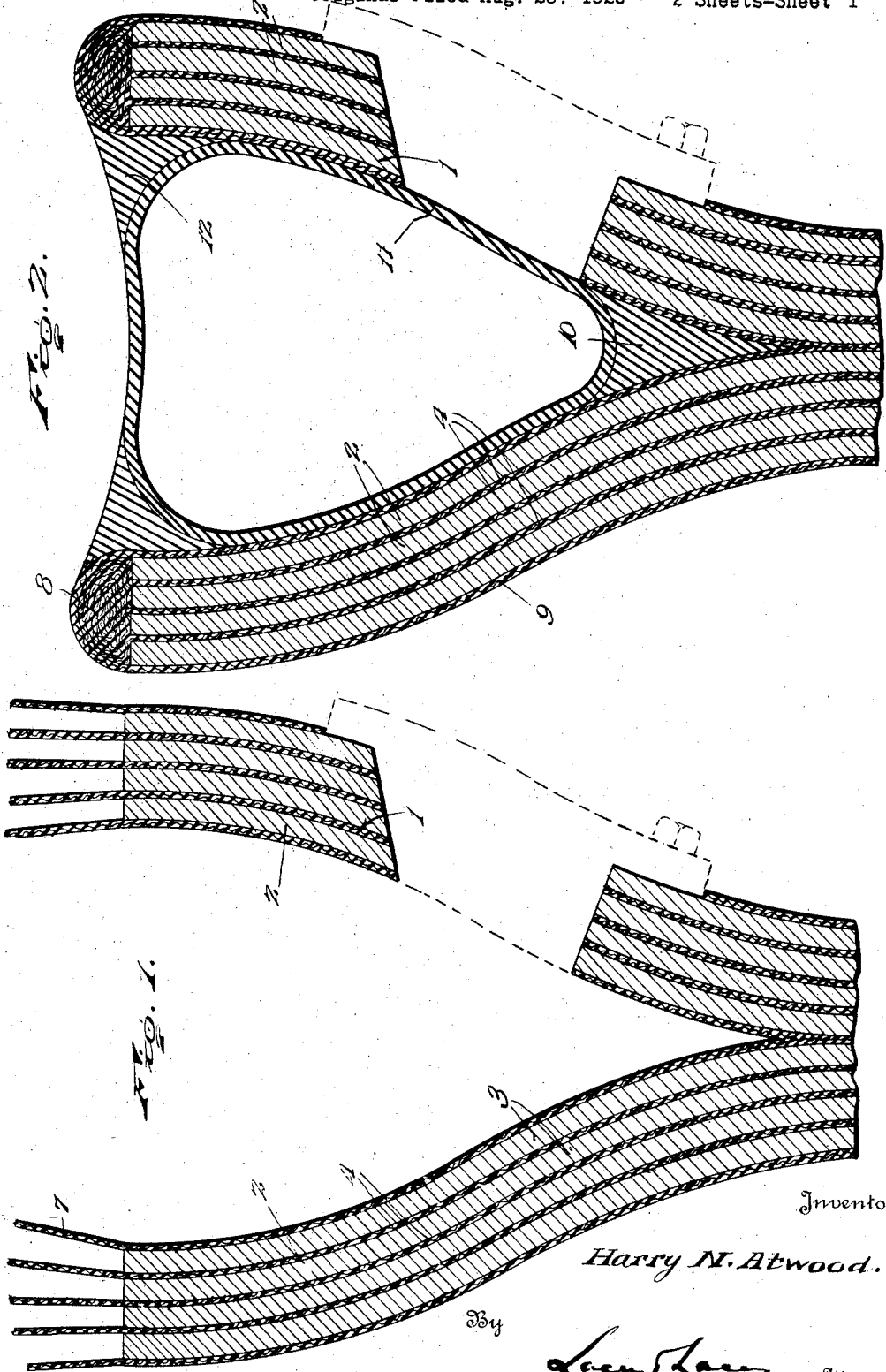

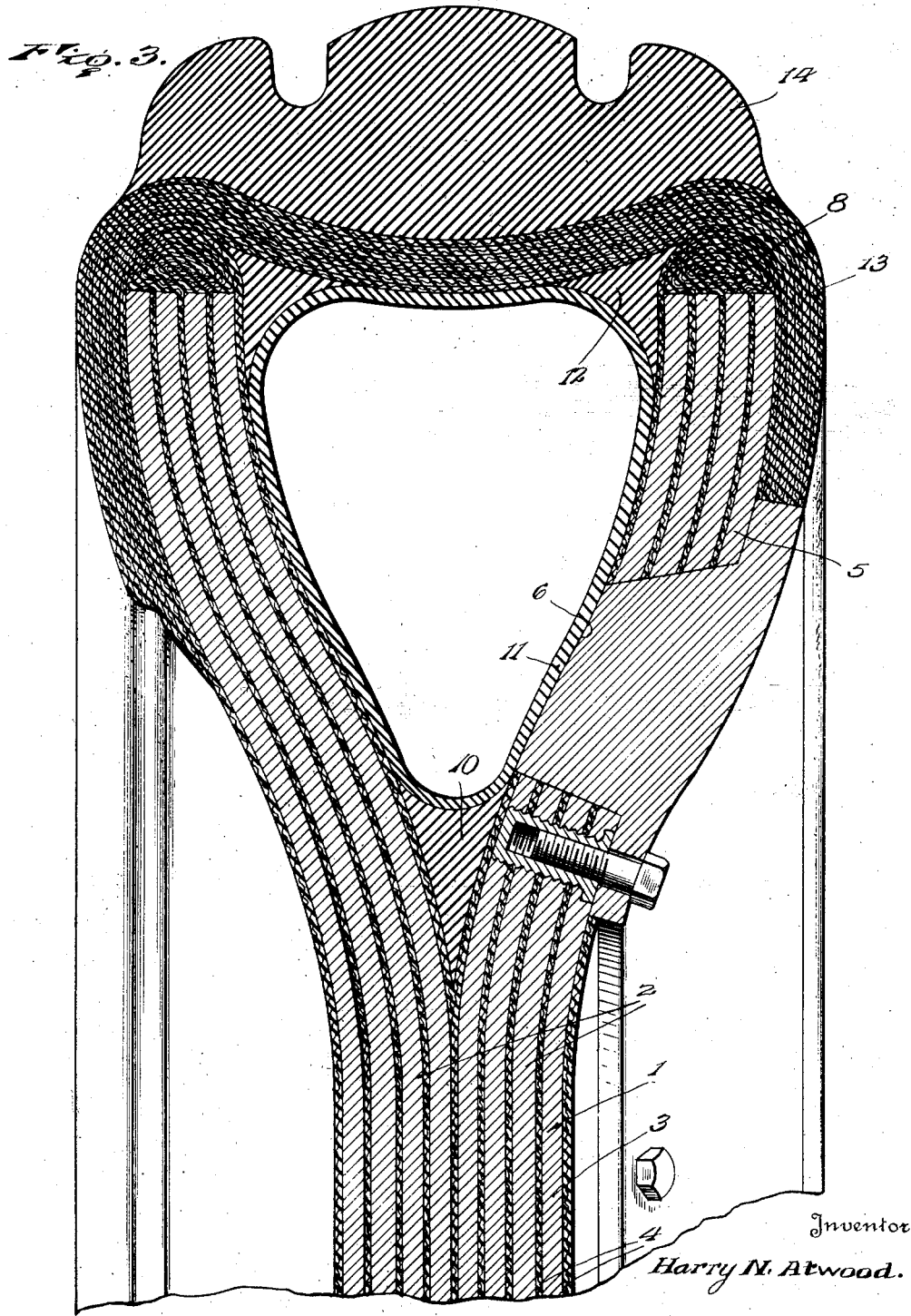

1,561,765

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

METHOD OF MANUFACTURING COMPOSITE VEHICLE WHEELS.

Application filed August 23, 1923, Serial No. 658,945. Renewed February 11, 1925.

*To all whom it may concern:*

Be it known that I, HARRY N. ATWOOD, a citizen of the United States, residing at Monson, in the county of Hampden and State of Massachusetts, have invented certain new and useful Improvements in Methods of Manufacturing Composite Vehicle Wheels, of which the following is a specification.

This invention relates to a method of manufacturing composite vehicle wheels.

The term "wheel" as ordinarily employed in the art comprehends a structure built up of a number of elements assembled and held together in various ways. For example, the wood spoke wheel or wood artillery wheel, as this type is commonly known, comprises an assemblage of solid wood spokes which radiate from a hub and which are held in their assembled relation by a felloe about which is adapted to be applied a metal rim and to which rim is fitted a pneumatic tire casing, or a solid rubber tread. In another type, namely the wood disc wheel, the body of the wheel is made up of plies of wood facially bonded to each other, and the body is equipped with a rim, a hub and other appurtenances required to complete the structure. In a similar type of wheel the body is of sheet metal. It is evident therefore that an ideal wheel structure would be one in which all component parts possess like qualities and physical characteristics and in which all of the component parts would be so united and bonded together that the wheel would constitute an integral whole, such component parts serving the equivalent purposes of the usual felloe, rim, and cushioning tread. Such a wheel is disclosed in my co-pending application filed August 23, 1923, Serial No. 658,944, and the present invention relates to the method of producing the wheel.

In the accompanying drawings:

Figure 1 is a sectional view illustrating one of the first steps in the manufacture of the wheel;

Figure 2 is a similar view illustrating a subsequent step;

Figure 3 is a sectional view illustrating the completed wheel.

The wheel body is indicated in general by the numeral 1 and the same comprises two sections which are indicated by the numeral 2 and which are of composite structure. In producing each of these sections 2, a number of plies 3 of veneer or other similar fibrous material suitable for the purpose are cut to the required circular form and are alternately arranged with bonding plies 4 of soft rubber in an uncured or semi-cured state, or the plies 4 may be of rubberized fabric or of a composition of rubber and other materials. After the plies have been assembled the assemblage is subjected to heat and pressure in a suitable form so as to impart a predetermined permanent shape thereto, and in this operation the peripheral portions of the two sections are outwardly dished to provide the walls 5 of a pneumatic chamber 6 which is present in the completed wheel. In this step of the method, the plies become intimately bonded so that each section, when taken from the vulcanizing apparatus, is of a uniform composite structure. It is preferable that the bonding plies 4 be of a diameter greater than that of the body plies 2 so that the peripheral portions of the said plies 4 will project beyond the peripheries of the discs or plies 3 as indicated by the numeral 7 and as clearly shown in Figure 1 of the drawings.

The next step in the operation consists in interlaying these projecting portions of the plies 4, or in other words folding them upon themselves and upon one another until a rounded cushioning and protecting shoulder 8 is produced at the periphery of each section 2 as shown in Figure 2 of the drawings. A facing sheet or ply 9 of rubberized fabric or the like is then applied to the outer face of each section and worked over the peripheral shoulder 8 and to position against the inner face of the respective section, and after these facing plies have been suitably arranged in position, the two sections are assembled with their mid portions face to face as shown in Figures 1 and 2 and, in any suitable manner, held in this position while soft uncured rubber 10 is filled into the space between the diverging inner faces of the dished portions 5 of the wheel body. At the same time, or subsequently, an inner tube 11 is arranged within the chamber 6 as shown in Figure 2, and fillings 12 of soft uncured rubber are packed into the angle between the outer side of the tube and the peripheral portions of the walls 5 of the chamber and the said shoulders 8. The fillings 12 may extend only at the opposite sides of the tube 11 as shown in Figure 2 or completely over the side of the tube which is presented next to the tread of the wheel, this being a matter of choice.

In carrying out the next step of the method, a number of plies 13 of rubberized fabric are superimposed, and the foundation thus is disposed circumferentially about the wheel body produced in accordance with the previously described steps in the method. This foundation has its lateral portions arranged to lie against the outer faces of the walls 5 of the pneumatic chamber 6, and adjacent these portions the foundation extends over the rounded shoulders 8 with its intermediate portion extending between the said shoulders and closing the outer side of the chamber 6. A mass of soft rubber is then applied to the outer side of the foundation 13 to form the body of the tread of the wheel which is indicated by the numeral 14. The entire assemblage is then placed in a suitable mold and subjected to heat and pressure so as to vulcanize the whole and effect an intimate union of the component parts thereof. If desired, during the last described step, the inner tube 11 may be inflated so as to exert pressure in an outward direction against the walls of the pneumatic chamber 6 to further compress the constituent layers and plies defining this chamber.

Having thus described the invention, what is claimed as new is:

1. The method of manufacturing a composite wheel structure which comprises building up a body structure of body and bonding plies and shaping the peripheral portions of the plies to provide a peripheral chamber about the body, providing a cushioning air pocket in the chamber, and building up a tread upon the assemblage thus formed closing the outer side of the chamber and adapted to be sustained by the air pocket.

2. The method of manufacturing a composite wheel structure which comprises building up a body structure of body and bonding plies and shaping the peripheral portions of the plies to provide a peripheral chamber about the body structure, applying filling of yieldable material within the chamber to define wall surfaces of a contour to accommodate a pneumatic tube, and building up a tread upon the assemblage thus formed closing the outer side of the chamber and at its intermediate portion spanning the same.

3. The method of manufacturing a composite wheel structure which comprises building up a body structure of body and bonding plies, arranging the said bonding plies so that their peripheral portions will project beyond the peripheries of the body plies, shaping the peripheral portions of the assemblages of plies to provide a peripheral chamber, arranging the projecting peripheral portions of the bonding plies to provide cushioning and protecting shoulders at the peripheries of the walls of the chamber, and building up a tread extending between the walls across the outer side of the chamber and sustained by said walls.

4. The method of manufacturing a composite wheel structure which comprises building up a body structure of body and bonding plies, arranging the said bonding plies so that their peripheral portions will project beyond the peripheries of the body plies, shaping the peripheral portions of the assemblages of plies to provide a peripheral chamber, arranging the projecting peripheral portions of the bonding plies to provide cushioning and protecting shoulders at the peripheries of the walls of the chamber, applying a foundation of substantially nonstretching material about the body str ure closing the outer side of the chamber, uniting the foundation to the walls of said chamber, and building up a yieldable tread body upon said foundation.

5. The method of manufacturing a composite wheel structure which comprises building up a body structure of body plies of resilient material and bonding plies of rubber material and shaping the peripheral portions of the plies to provide a peripheral chamber about the body structure, arranging a foundation about the body structure of rubberized material and positioning the same with its lateral portions extending over the margins of the walls of the chamber and beside the outer faces of said walls, building up a tread body of rubber material upon the foundation, and subjecting the whole to a process of vulcanization whereby to effect intimate bonding and integral union of the several component parts.

6. The method of manufacturing a composite wheel structure which comprises assembling a plurality of alternately arranged plies of body material and plies of rubber bonding material with the bond plies projecting peripherally beyond the body plies, subjecting the assemblage to heat and pressure and simultaneously shaping the same to effect dishing of its peripheral portion, arranging the projecting portions of the bonding plies over the periphery of the assemblage as a whole to provide a cushioning shoulder, disposing two of the assemblages together so that the dished peripheral portions will provide between them a chamber, building a tread over the outer side of the chamber, and subjecting the whole to a process of vulcanization to effect intimate bonding of the component elements.

7. The method of manufacturing a composite wheel structure which comprises assembling a plurality of alternately arranged plies of body material and plies of rubber bonding material with the bonding plies projecting peripherally beyond the body plies, subjecting the assemblage to heat and pressure and simultaneously shaping the same to effect dishing of its peripheral portion, arranging the projecting peripheral portions of the bonding plies over the periphery of the assemblage as a whole to provide a cushioning shoulder, applying a facing layer of material embracing rubber, over the outer and inner faces of the assemblages and over the said shoulders to define the contour of the latter and confined the arranged projecting portions of the bonding plies, building up a tread upon the walls of said chamber overlapping the outer sides of the walls, and subjecting the whole to a process of vulcanization to effect intimate union of the component elements.

In testimony whereof I affix my signature.

HARRY N. ATWOOD. [L. S.]